Patented Sept. 29, 1953

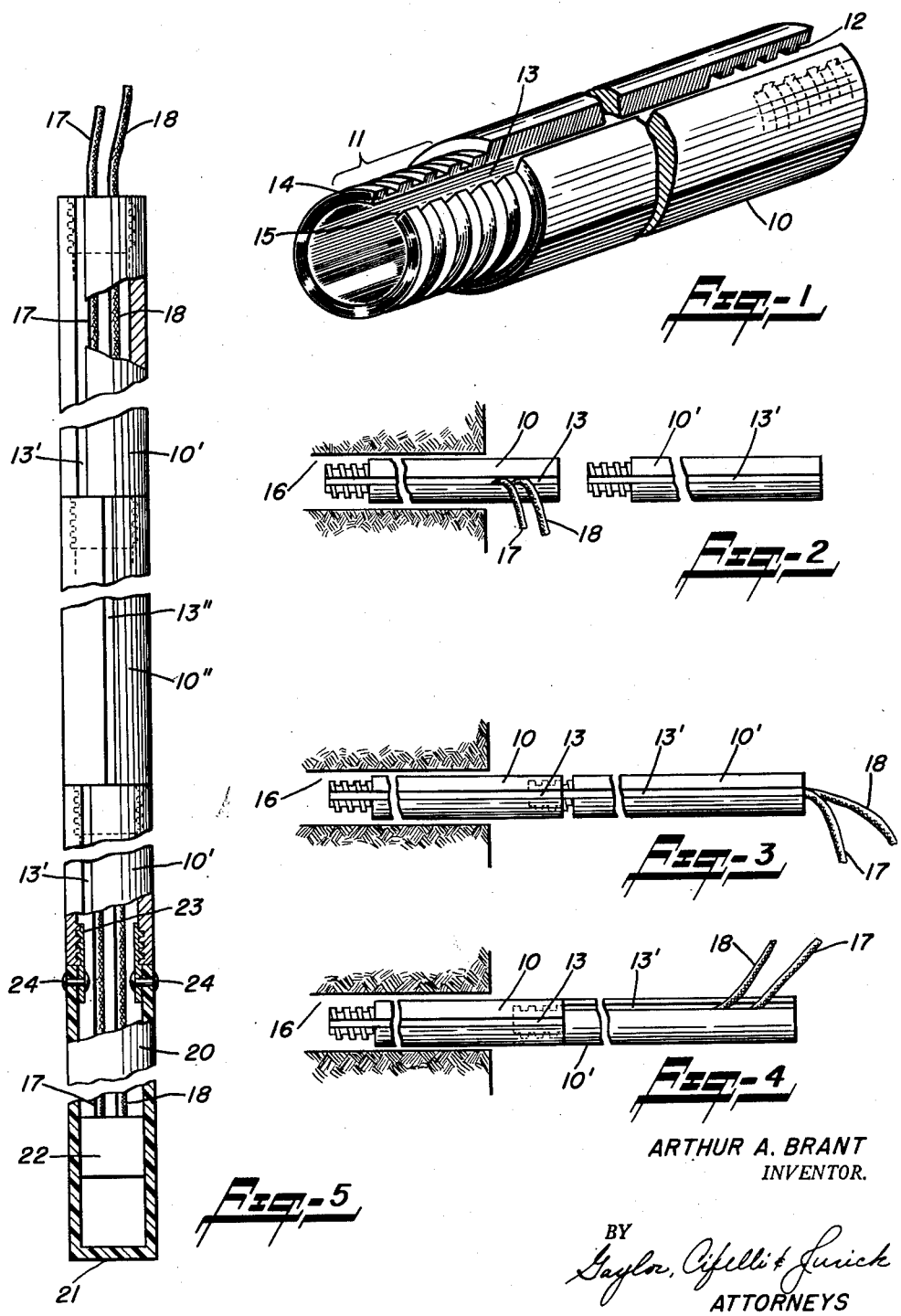

2,653,990

UNITED STATES PATENT OFFICE 2,653,990

APPARATUS FOR USE IN MAKING GEOPHYSICAL EXPLORATIONS

Arthur A. Brant, Clarkdale, Ariz., assignor to Newmont Mining Corporation, New York, N. Y., a corporation of Delaware Application March 21, 1951, Serial No. 216,751

2 Claims. (Cl. 174—68)

1

This invention relates to apparatus for use in geophysical exploration and more particularly to a novel arrangement of tubular members adapted for insertion into a drill hole and which arrangement does not require axially threading of the electrical connecting cables through the individual tubular members as they are joined together and inserted into the hole.

In diamond drilling no mud fluid is used so that the walls of the hole do not become caked, as in oil drilling. Consequently, such holes often cave in upon removal of the drill or the protective steel casing when such is used. As a result many such holes are not available for geophysical investigations. More importantly, such caving or sluffing in the hole often occurs after the electrical or other physical measurement apparatus has been inserted into the hole resulting in the loss of valuable equipment.

Further, and importantly, many diamond drill holes are at flat angles so that the geophysical measuring or detecting apparatus cannot be inserted into the hole by its own weight but, rather, must be pushed thereinto by means of rods or tubes. Often such apparatus and the connecting cables cannot be inserted into such flat drill holes to an appreciable extent. One important feature of this invention is the provision of simple, practical means for inserting the apparatus into such drill holes.

An object of this invention is the provision of tubular members adapted for easy, axial connection to form a readily insertable and withdrawable protective shell within a drill hole enabling geophysical recording devices to be readily inserted and withdrawn from a hole having any angle.

An object of this invention is the provision of a protective shell for use in drill hole, said shell including a longitudinal slot for insertion of electrical cables into the shell.

An object of this invention is the provision of a protective tube for use in a relatively long drill hole, said tube formed of axially-joined tubular sections each having a longitudinal slot extending the full length thereof.

An object of this invention is the provision of a removable protective tube for subterranean geophysical exploration, said tube comprising a plurality of tubular sections each such section having a radially-tapered slot extending lengthwise of the section and each section having co-acting, threaded ends whereby adjacent sections may be united in axial relationship with the slots thereof angularly displaced from each other.

These and other objects and advantages will be apparent from the following description when taken with the accompanying drawings. The drawings are for purposes of illustration and are not to be construed as defining the scope or limits of the invention, reference being had for the latter purpose to the appended claims.

In the drawings wherein like reference characters denote like parts in the several views:

Figure 1 is an isometric view of a tubular member made in accordance with my invention;

Figures 2-4 are side views illustrating how such tubing members are united together for insertion into a drill hole and how the electrical cables are inserted through the slots in the tubing walls; and Figure 5 is a general elevation view, with parts broken away, showing a plastic tubular member that houses the detecting apparatus.

Referring now to Figure 1, the tubular member 10 has a reduced-diameter, externally-threaded section 11 on one end, and an internally-threaded section 12 on the other end. Such tubular member, which may be made of metal, plastic, or other suitable material, is provided with a longitudinal slot 13 extending the full length thereof. The slot has diverging side walls 14, 15 such that the width of the slot along the inside circumference of tubular member is less than that along the outside circumference and the minimum such slot dimension is equal to, or slightly less than, the diameter of the individual cables to be used in the geophysical investigations, as will become more apparent hereinbelow. Individual tubular members may be joined together axially, by means of the co-acting threaded sections, to form a long protective tube within a drill hole.

Reference is now made to Figure 2 wherein one tubular member 10 is shown partially inserted into a flat drill hole 16. Assuming this member contains a detecting device of a type used in making geophysical explorations, cables, such as the two shown and identified by the numerals 17, 18, must extend externally of the drill hole. Such cables are used to make necessary electrical connections between the detector and suitable measuring apparatus. It will be apparent that when the drill hole is long many individual tubing members are required and the cables are, likewise, unduly long. In the past it has been necessary to thread such cables through each tubing member as the long protective tube is formed and inserted into the drill hole or, more simply, to allow the cables to remain outside the tubing as insertion of the detector and cable into the drill hole took place. The cables carried outside of the protective tube frequently become fouled, wedged or locked, by the collapse of the walls defining the drill hole, resulting in damage thereto or complete loss thereof. Tubing members made in accordance with this invention obviate the need for threading the cables through each tubing section (or leaving the cables outside of the tubing) and provide a simple means for inserting the cables and detecting device into a flat drill hole with the assurance of recovering the tubing, detector and cables in the event the drill hole collapses.

As shown in Figure 2, the cables 17, 18 may extend through the slot 13 in the member 10 at a point somewhat removed from the threaded end of such section. The next tubular member 10' is threaded into the member 10 until the last alignment of the slots 13, 13' is made. The cables are then pressed into the tubular member 10' through the longitudinal slot 13', as shown in Figure 3. If the base width of the slot is equal to, or slightly less than, the outside diameter of the individual cables, the cable will remain within the tubular section at all times and under all conditions, until specifically withdrawn by the operator. Once the cables have been inserted within the tubular section 10' this section may be given the last fraction of a turn to provide a tight joint, as shown in Figure 4. It will be noted that the threads of adjacent tubular sections may be so formed that when such sections are screwed up tight the longitudinal slots are displaced angularly with respect to each other. Such arrangement imparts added strength to the protective tube, as a whole, and, at the same time, serves to retain the cables within the tube when the longitudinal slots, in the individual tubular sections, are wider than the cable diameter. Additional tubular members may be added, and likewise joined together, to form a protective tube of desired length and the geophysical detector and cables thus pushed into the hole to any desired distance. After the geophysical investigations have been completed, a reverse operation is employed to disconnect the tubular sections and remove the protective tube from the drill hole.

In general, the tubing sections, above described, are made, preferably, of metal such as aluminum alloy having the desirable characteristics of strength, durability and light weight. However, certain geophysical investigations involving the establishment of potentials and/or current flow between the detecting apparatus and the surrounding medium cannot be made when such apparatus is adjacent to a metal casing. In such case I provide one or more plastic, tubular sections, joined to the metal sections and which carry the actual detecting apparatus. Obviously, such plastic section may be made identical to the metal member shown in Figure 1.

As a still further, practical consideration, the leading tubular section should, preferably, have a closed end to prevent the entrance of foreign matter thereinto as the section is pushed along, or down into, the drill hole. Figure 5 illustrates a simple arrangement for this purpose. The leading tubular section 20 having a closed end 21, is made of a suitable insulating material, such as a plastic, and the detecting apparatus 22 is disposed therein. The other end of the plastic section has a collar 23 attached thereto by the rivets 24, such collar having an externally-threaded section that co-acts with the internally-threaded portion of the adjacent tubular section 10'. There is no particular difficulty in inserting the detecting apparatus within the plastic section 20 as such section may be made shorter than the metallic sections to be joined thereto. If the plastic tubular section 20 be substituted for the metal section 10, in Figure 2, it will be apparent such plastic section can be pushed into the drill hole by succeeding tubular sections threaded together in series, and that the connecting cables 17, 18, attached to the detecting apparatus, may be inserted into each succeeding tubular section through the longitudinal slot therein, as already described. Where it is desirable to use more than one detecting apparatus, each disposed at a different, predetermined depth in the drill hole, the protective tube may include additional, plastic tubing sections inserted among the metal sections. With the possible exception of the leading tubular section, such additional plastic sections would, of course, be open at both ends to permit passage of the connecting cables therethrough.

From the above description of my invention, those skilled in this art will understand the protective tubing, so formed, permits the use of any type of detecting apparatus or electrode array for making overvoltage, resistivity, self-potential, electromagnetic, gravity, seismic, Ph, radio-activity, thermal, etc., measurements within a flat, upward or downward inclined drill hole, as well as drill hole bearing and dip surveys. The necessary apparatus and associated connecting cables may safely and conveniently be inserted into and withdrawn from any drill hole regardless of the hole size or its inclination and without damage due to caveins. The described arrangement is useful, especially, in connection with horizontal, low-angle, and "up-hole," drill holes.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A tubing arrangement for insertion into a drill hole for the purpose of making geophysical exploration by means of apparatus disposed within the tubing and electrically connected to a point external of the drill hole by a cable extending through the tubing, said arrangement comprising a plurality of axially-disposed tubes, the external surfaces of adjacent tubes being in flush relation to each other; means forming a longitudinal slot extending the full length of each tube and completely through the tube wall; and complementary threads on the ends of adjacently-disposed tubes, said threads being oriented with respect to the associated tube slot such that the slots in adjacent tubes can be alined by rotating one tube relative to the other, thereby permitting passage of the cable through the mutually-threaded portions of the tubes, and the tube slots in adjacent tubes will be out of alinement when the tubes are tightened into the fully threaded position, thereby preventing passage of the cable through the mutually-threaded portions of the tubes.

2. The invention as recited in claim 1, wherein the side walls defining the tube slots lie in diverging planes and the minimum slot width is substantially equal to the cable diameter.

ARTHUR A. BRANT.

References Cited in the file of this patent

UNITED STATES PATENTS

| Number | Name | Date |
|---|---|---|
| 341,327 | Fay | May 4, 1886 |
| 2,197,493 | Ellis et al. | Apr. 16, 1940 |
| 2,262,419 | Athy et al. | Nov. 11, 1941 |
| 2,289,271 | Kane et al. | July 7, 1942 |

OTHER REFERENCES

Publication: "Electrical World," August 22, 1908, page 405. (A copy in Division 52, 138–47.)